United States Patent
Amsalem et al.

(10) Patent No.: US 12,316,772 B2
(45) Date of Patent: May 27, 2025

(54) HOME CONTEXT-AWARE AUTHENTICATION

(71) Applicant: Synamedia Limited, Middlesex (GB)

(72) Inventors: Orly Amsalem, Jerusalem (IL); Steve Epstein, Hashmonaim (IL)

(73) Assignee: Synamedia Limited, Middlesex (GB)

( * ) Notice: Subject to any disclaimer, the term of this patent is extended or adjusted under 35 U.S.C. 154(b) by 538 days.

(21) Appl. No.: 17/202,033

(22) Filed: Mar. 15, 2021

(65) Prior Publication Data

US 2022/0294639 A1    Sep. 15, 2022

(51) Int. Cl.
| | |
|---|---|
| *H04L 29/06* | (2006.01) |
| *G16Y 20/10* | (2020.01) |
| *G16Y 40/10* | (2020.01) |
| *H04L 9/32* | (2006.01) |
| *H04L 67/50* | (2022.01) |

(52) U.S. Cl.
CPC ............ *H04L 9/3247* (2013.01); *G16Y 20/10* (2020.01); *G16Y 40/10* (2020.01); *H04L 67/535* (2022.05)

(58) Field of Classification Search
CPC ................. H04L 9/3247; H04L 67/535; H04L 2463/082; H04L 9/3236; H04L 63/0876; H04L 63/101; H04L 63/105; H04L 67/60; H04L 9/3228; G16Y 20/10; G16Y 40/10
See application file for complete search history.

(56) References Cited

U.S. PATENT DOCUMENTS

| | | | |
|---|---|---|---|
| 8,656,475 B2 * | 2/2014 | Eom | H04L 9/3247 |
| | | | 726/4 |
| 8,805,352 B2 | 8/2014 | Mathews | |
| 8,875,244 B1 * | 10/2014 | Vaystikh | H04L 63/0815 |
| | | | 709/225 |
| 10,129,236 B2 * | 11/2018 | Gomi | H04L 63/08 |
| 10,205,997 B2 * | 2/2019 | Epstein | H04N 21/44204 |
| 10,263,868 B1 * | 4/2019 | Baldi | H04W 12/02 |
| 10,674,211 B2 | 6/2020 | Tirpak | |
| 11,134,081 B2 * | 9/2021 | Llamas Virgen | H04L 63/101 |
| 11,336,744 B2 * | 5/2022 | Greenberg | H04L 67/02 |
| 11,429,698 B2 * | 8/2022 | Geng | H04L 63/0876 |
| 2008/0077977 A1 * | 3/2008 | Naccache | H04L 9/3271 |
| | | | 726/5 |
| 2008/0183622 A1 * | 7/2008 | Dixon | G06Q 20/0855 |
| | | | 705/44 |
| 2009/0172798 A1 * | 7/2009 | Upp | H04L 9/3271 |
| | | | 726/10 |
| 2011/0016534 A1 * | 1/2011 | Jakobsson | H04L 67/535 |
| | | | 726/28 |

(Continued)

FOREIGN PATENT DOCUMENTS

| | | | | |
|---|---|---|---|---|
| AU | 2012376802 A1 * | 10/2014 | .......... | H04W 12/062 |
| CN | 101588244 A * | 11/2009 | ............. | G06F 21/57 |

(Continued)

*Primary Examiner* — Sher A Khan
(74) *Attorney, Agent, or Firm* — Merchant & Gould P.C.

(57) ABSTRACT

Context-aware authentication may be provided. First, a request may be received for content service. The request may comprise information associated with a context of a household from which the request came. Next, the request may be authenticated based on the information associated with the context of the household from which the request came. Then the content service may be provided in response to authenticating the request.

20 Claims, 3 Drawing Sheets

(56) References Cited

U.S. PATENT DOCUMENTS

| | | | |
|---|---|---|---|
| 2011/0167440 A1* | 7/2011 | Greenfield | H04L 63/107 |
| | | | 455/411 |
| 2013/0054433 A1* | 2/2013 | Giard | H04L 63/08 |
| | | | 709/224 |
| 2013/0132484 A1* | 5/2013 | Berezecki | H04L 61/4511 |
| | | | 709/205 |
| 2015/0227732 A1* | 8/2015 | Doctor | G06F 21/31 |
| | | | 726/4 |
| 2015/0278504 A1* | 10/2015 | Azim | H04W 12/065 |
| | | | 726/3 |
| 2016/0364794 A1 | 12/2016 | Chari et al. | |
| 2017/0093915 A1* | 3/2017 | Ellis | H04L 63/04 |
| 2017/0264439 A1* | 9/2017 | Muhanna | H04L 63/0428 |
| 2018/0069879 A1* | 3/2018 | Epstein | H04L 12/2825 |
| 2018/0248863 A1* | 8/2018 | Kao | H04L 63/102 |
| 2018/0316670 A1* | 11/2018 | Brown | H04L 63/0884 |
| 2019/0089748 A1* | 3/2019 | Manor | H04L 41/0893 |
| 2019/0190903 A1* | 6/2019 | Chen | H04L 9/0841 |
| 2019/0238538 A1* | 8/2019 | Shaw | H04L 63/0227 |
| 2020/0014538 A1* | 1/2020 | Liu | H04L 9/3231 |
| 2020/0244653 A1* | 7/2020 | Eichelberger | H04L 63/1425 |
| 2020/0274868 A1* | 8/2020 | Passaglia | H04L 63/083 |
| 2021/0120307 A1* | 4/2021 | Bastable | H04N 21/4334 |
| 2021/0136096 A1* | 5/2021 | Janakiraman | H04L 63/1425 |
| 2021/0160558 A1* | 5/2021 | Sorkin | H04N 21/262 |
| 2021/0195541 A1* | 6/2021 | Wei | H04W 72/21 |
| 2022/0224685 A1* | 7/2022 | Dhindsa | H04L 63/0853 |
| 2022/0231990 A1* | 7/2022 | Maarseveen | H04L 61/103 |

FOREIGN PATENT DOCUMENTS

| | | | | | |
|---|---|---|---|---|---|
| CN | 103875015 | A | * | 6/2014 | G06F 21/316 |
| CN | 104125201 | A | * | 10/2014 | |
| CN | 105827624 | A | | 8/2016 | |
| CN | 107784209 | A | * | 3/2018 | G06F 21/31 |
| CN | 110311783 | A | * | 10/2019 | H04L 9/3239 |
| CN | 106797371 | B | | 5/2021 | |
| EP | 2999241 | A1 | | 3/2016 | |
| EP | 3468133 | B1 | * | 3/2021 | H04L 29/06 |
| KR | 20140116510 | A | * | 10/2014 | |
| KR | 20140135039 | A | * | 11/2014 | |
| WO | WO-2012054911 | A1 | * | 4/2012 | H04L 63/162 |
| WO | WO-2013147757 | A1 | * | 10/2013 | H04L 63/0838 |
| WO | WO-2014088912 | A1 | * | 6/2014 | G06F 21/552 |
| WO | WO-2020163019 | A1 | * | 8/2020 | G06Q 20/322 |

* cited by examiner

HOME CONTEXT-AWARE AUTHENTICATION

TECHNICAL FIELD

The present disclosure relates generally to user authentication.

BACKGROUND

In many systems, users may be asked to login to video content services in order to prove their identity. One such example may comprise the use of video content viewing services over the Internet. Video content users, however, may have difficulty with remembering or locating their passwords, and as such, video service providers may seek to limit the frequency with which the passwords are requested, without compromising security. Also passwords may be shared or stolen to enable a malicious user to receive video content without compensating the video service provider.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Context-aware authentication may be provided. First, a request may be received for content service. The request may comprise information associated with a context of a household from which the request came. Next, the request may be authenticated based on the information associated with the context of the household from which the request came. Then the content service may be provided in response to authenticating the request.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Credential sharing and fraudulent credential abuse are problems for service providers and content service providers (e.g., video service providers). While securing their services may be important to service providers, complicating the authentication process for their end users may be possible. The result may be that service providers may compromise on a secure and authentic access to their services for the benefit of a friendly user experience. Also, there may be no way of knowing whether user who enters a password is the valid account owner or just a person the valid account owner shared the password with or a malicious user (e.g., a fraudster).

Subscribers to content services (e.g., video content services for moves, shows, news, sporting events, etc.) may share their access to the content service with others outside their household for example. In some cases, this may not be acceptable to the content service provider, and may be prohibited in the terms and conditions the content service provider offers. When there is a password process (or a Multi-Factor Authentication (MFA) process), sharing the password may be inevitable. In addition, a username and password that identify a "user" rather than a "household" may help to disguise the sharing with other users that do not belong to the same household.

Additionally, leakage of usernames and passwords due to data breaches may be common, and billions of those compromised credentials may end up for sale on marketplaces on the dark and open web. The potential buyers of those credentials may apply brute-force attacks or credentials stuffing attacks in order to find credentials that will work on other services. Again, when there is a username and password, stealing the password may be inevitable.

Sharing credentials or using stolen credentials may cause damage to service providers, which may translate to revenue losses and tarnished reputations. A solution for preventing credential sharing or illicit sign-in using stolen credentials may comprise a "password-less" authentication process. This password-less authentication process may assumes the end user may be identified by "something they have", which may comprise, for example, a secondary device possessed by the end user. The password-less authentication process in this case may include a one-time or temporary code sent by Short Message Service (SMS) or email to another device possessed (e.g., registered) by the end user. The end user may then enter this one-time or temporary code in order to authenticate. However, the end user, who may be the valid account owner, may share this one-time or temporary code with another user who may use it to obtain video services, for example, without compensating the video service provider. Other solutions may rely on "who you are" and use biometrical processes such as a fingerprint as an authentication factor. The disadvantage of these processes may be that they complicate the authentication process in a way that end users may not be able to complete it. In addition, biometric authentication may requires technology that may not be accessible to all users (i.e., not all end users may have access to a fingerprint reader). Moreover, biometric authentication cannot be assumed to be equal across all devices and biometric identity may be stolen. This may make biometrical processes solutions unusable for content service providers.

In order to address the aforementioned issues, context-aware authentication may be provided by embodiments of the disclosure. Context-aware authentication may shift the responsibility for the authentication process from the end user. The end user may not be required to create a username, remember a password, change passwords, or use an MFA process. Embodiments of the disclosure may define a "household" authentication rather than a single end user authentication for applications that allows household access. Typically, service contract terms and conditions may define service access on a per physical house and not per user, so embodiments of the disclosure may be consistent with business realities.

According to embodiments of the disclosure, context-aware authentication may comprise an end user authentication service that may identify the end user based on their context (i.e., the end user may prove that the end user is in the house in order to gain access). Context-aware authentication may comprise identification based on where the end user may be and how the end user may behave as opposed to what the end user may have (e.g., identifying a unique device the end user may have) or who the end-user is (e.g., fingerprint). According to embodiments of the disclosure, content-aware authentication may: i) prevent credential sharing (e.g., friendly credential sharing outside a household and fraudulent credential abuse); and ii) facilitate an improved user experience in the authentication process. This may be achieved by eliminating the need for a password. Instead of a username and password to identify an end user, context-aware authentication may use, for example, machine-learning and behavioral analytics on information associated with a context of a household. Information associated with the context of the household may comprise, for example, the end user's Internet-of-Thing (IoT) devices associated with the household and network traffic associated with the household. The network traffic associated with the household may comprise, for example, the internal network traffic between the different devices within the household as well as the network traffic from a home gateway or router to the service provider. Using information associated with a context of a household, embodiments of the disclosure may identify a household uniquely (e.g., embodiments of the disclosure may assume houses have different devices with different network patterns, Internet Service Providers (ISPs), IP addresses, etc.).

In addition, information associated with the context of the household may only be visible to the service provider, and the process that may create the household identity and confirm the login attempt may be secret and known only to the service provider. This may allow the authentication process to be secured and difficult to forge. Accordingly, the authentication process may be moved to and controlled by the service provider. Thus the authentication supplier may comprise, but is not limited to, the service provider, which may be responsible for running a process that may create the context for each household as well as to verify given context by different content service providers when they request to verify a household.

Every device in a household may receive a signature of their household with which they may be able to authenticate with the content service provider. If the device changes context (e.g. out of home, shared credentials etc.) for any reason, they may be given a grace period to continue the authentication even without their regular context or they may be blocked per a service policy for example.

Figure 1:
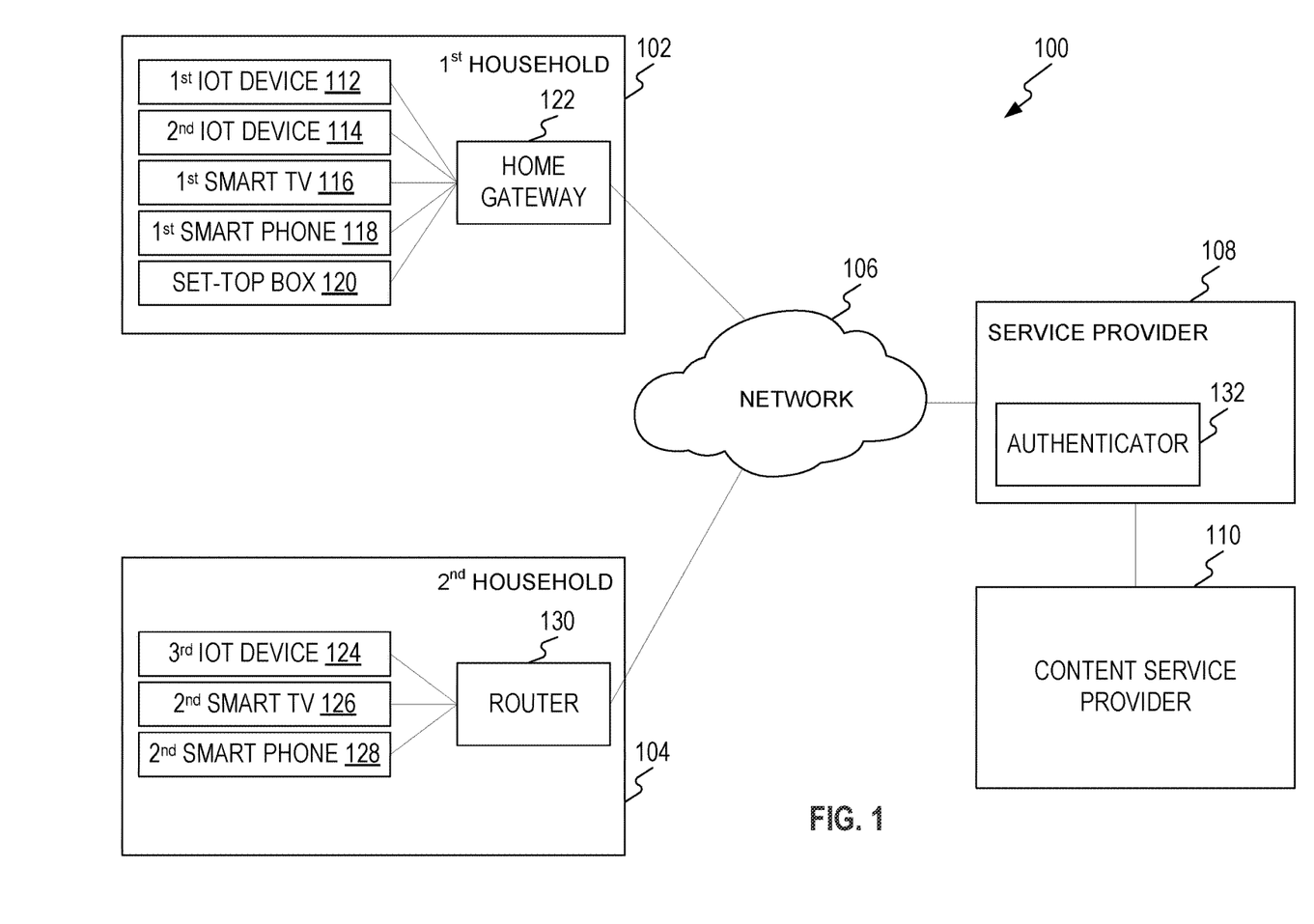
FIG. 1 is a block diagram of an operating environment for providing context-aware authentication.

FIG. 1 shows an operating environment 100 for providing context-aware authentication. As shown in FIG. 1, operating environment 100 may comprise a first household 102, a second household 104, a network 106, a service provider 108, and a content service provider 110. The households may comprise physical entities of several family members and their main location. End users may comprise people in a household that may connected devices, for example, to the internet using a broadband service and use applications and services that may require authentication by a content service provider that may be external to the broadband service provider.

First household 102 may comprise a place where a first plurality of people may stay from time-to-time and where they may cohabitate. The first plurality of people may operate one or more of a first plurality of devices that may comprise a first Internet-of-Things (IoT) device 112, a second IoT device 114, a first smart television (TV) 116, a first smart phone 118, and a set-top box 120. Second household 104 may comprise a place where a second plurality of people may stay from time-to-time and where they may cohabitate. The second plurality of people may operate one or more of a second plurality of devices that may comprise one or more of a third IoT device 124, a second smart TV 126, and a second smart phone 128. Notwithstanding, the first plurality of devices and the second plurality of devices may comprise, but are not limited to, any combination of devices comprising a smart phone, a personal computer, a tablet device, a mobile device, a telephone, a remote control device, a set-top box, a digital video recorder, an IoT device, a network computer, a router, or other similar microcomputer-based device. Home gateway 122 may comprise any type device that may allow and manage the first plurality of devices' access to network 106. Similarly, router 130 may comprise any type device that may allow and manage the second plurality of devices' access to network 106. Consistent with embodiments of the disclosure, IoT devices and their network traffic may contribute to the signature even if the IoT devices cannot use the signature to access video or other media services.

Network 106 may comprise any type network that a service provider may provide data transportation (e.g., communications) to and from first household 102 and second household 104 and over which content service provider 110 may provide content service. Network 106 may comprise, for example, the Internet, and may be provided over a wired system, a wireless system, or a combination thereof. Network 106 may provide communications to and from first household 102 and second household 104 via a Hybrid Fiber-Coaxial (HFC) network, a Long-Term Evolution (LTE) network, a Fourth Generation (4G) network, a Fifth Generation (5G) network, a Wi-Fi network (i.e., consistent with the Institute of Electrical and Electronics Engineers (IEEE) 802.11 specification standard for example), a Bluetooth network, a Wireless Local Area Network (WLAN), or any combination thereof.

Service provider 108 may comprise, for example a broadband or an Internet Service Provider (ISP) that may provide first household 102 and second household 104 with network services over network 106. Authenticator 132, as described in more detail below, may be provided by service provider 108 and may keep the context for each household/user based, for example, on their traffic, IoT devices, and household signature and the associated service. For example, authenticator 132 may analyze traffic of an end user in a household to create a household context including information provided by discovery protocols reporting on IoT devices in the household. Authenticator 132 may maintain, for each household, a list of context signatures over time and a list of services accounts (e.g., video service accounts) that may be associated to a specific household (i.e., context). When requested, authenticator 132 may authenticate a signature and provide feedback if the context is updated and belongs to the same household. Authenticator 132 may also enforce a higher level of security when necessary, by asking for example, the household network questions that only that network and or household may answer. This may ensure that a user may not just copy the network signature and send it to a friend as may be done with the one-time or temporary code as described above.

Content service provider 110 may comprise, for example, an enterprise that may provide content to first household 102 and second household 104 over network 106. The provided content may require authentication on a single end user level or household level and may comprise, but not limited to, TV programs, movies, new, sport events, etc. In some embodiments service provider 108 and content service provider 110 may comprise the same entity. Actions may be performed by content service provider 110 (or service provider 108 when acting as content service provider 110). These actions may comprise: i) getting requests to start streaming; ii) asking authenticator 132 to authenticate a request for access to its services, specifically, if a video service account is associated with a certain household; and iii) getting a response from authenticator 132 regarding the verification status of the request and provide access to their services accordingly. Accordingly, the end user may use the internet as usual and may be able to use services provided by content service provider 110 without the need to create a username and remember passwords for example.

The elements described above of operating environment 100 (e.g., first IoT device 112, second IoT device 114, first smart TV 116, first smart phone 118, set-top box 120, home gateway 122, third IoT device 124, second smart TV 126, second smart phone 128, router 130, and authenticator 132) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
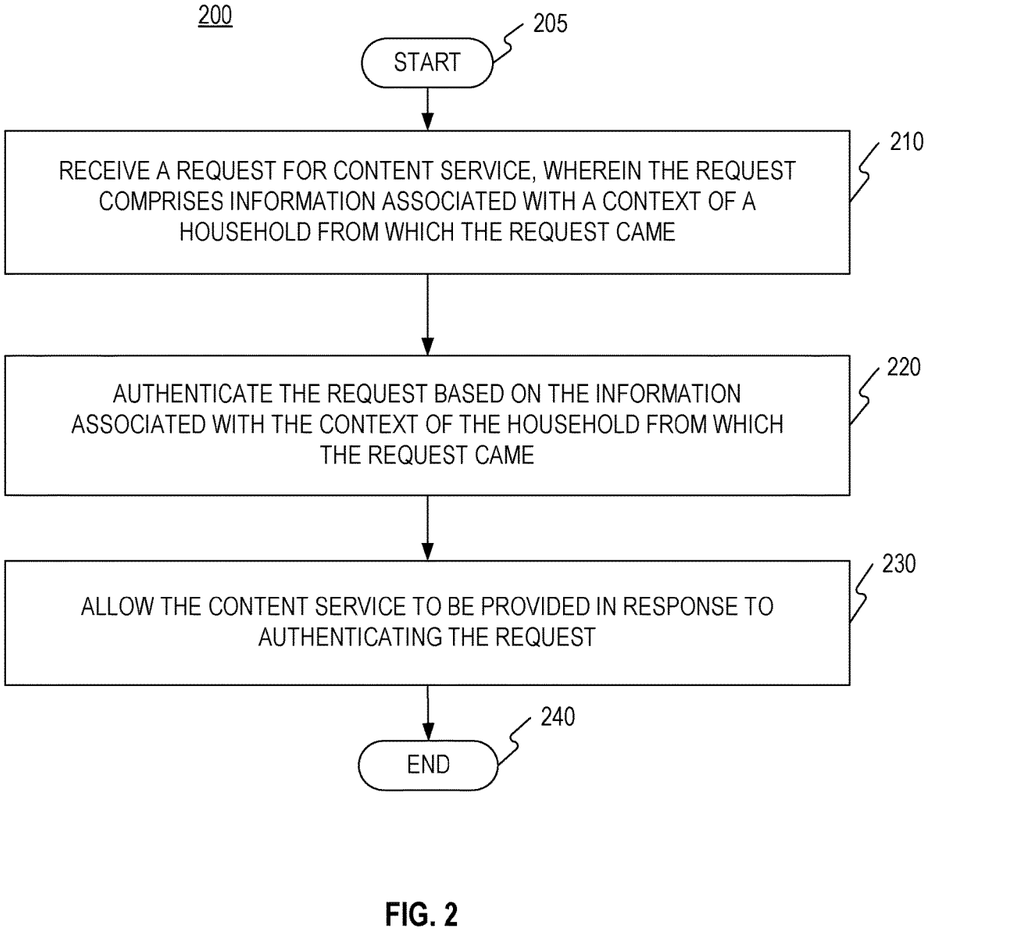
FIG. 2 is a flow chart of a method for providing context-aware authentication.

FIG. 2 is a flow chart setting forth the general stages involved in a method 200 consistent with an embodiment of the disclosure for providing context-aware authentication. Method 200 may be implemented using authenticator 132 as described in more detail above with respect to FIG. 1. Ways to implement the stages of method 200 will be described in greater detail below.

Method 200 may begin at starting block 205 and proceed to stage 210 where authenticator 132 may receive a request for content service. The request may comprise information associated with a context of a household from which the request came. IP addresses may be used to filter possible households. For example, authenticator 132 may first build a list of signatures with their associated content services they are eligible to receive from content service provider 110. For first household 102, authenticator 132 may receive the following information from one or more of the first plurality of devices in first household 102 or home gateway 122, which may enable it to create the dynamic context for first household 102: i) discovery protocol information of one or more of the first plurality of devices in first household 102; and ii) input and output traffic for first household 102 (to some extent, could be sampled). Based on that information, authenticator 132 may build a unique signature that identifies first household 102. The signature may encapsulate the context information of the IoT devices in first household 102 as well as some basic traffic first household 102 is doing. Once it is determined that the request is from household 102, a service level may be allowed according to a service level purchased for household 102.

This signature is unique to first household 102 at a certain time because the context of the household may be changed over time (e.g., due to the addition of more IoT devices, different networks usage, etc.). The context may be updated in a relatively higher resolution in order to protect freeloaders to break or be invited to use a household network in order to be associated with the same household. The signature may be created on a video service application on a device in first household 102 or by authenticator 132 that may receive the data from the video service application. The signature may also contain information on the last few signatures for verification needs for example.

The context may be created using a process that may take the IoT devices, discovery protocols, or some network of the house and convert it into a (dynamic) unique identifier (signature). Each context may be relevant to a specific time. If an old context is used, it may be possible to associate it with a relevancy date. This may help, for example, to identify attempts to forge authentication. Similarly, a signature may be created and maintained for second household 104.

For a first time connection, when an end user installs a streaming application for the first time and connects to it, the streaming application in the background may start the discovery process and may ask from authenticator 132 to associate between the context and the video streaming application account. In other words, the video streaming application may register itself in an authentication table associating between a household and an account. In this process, the end user may not be not requested to do anything because there may be no need to create a username or user a password for example. For example, several samples of network traffic may be captured over time to account for dynamic changes of signatures throughout the day.

For a next time connection, after the first login to the video streaming application, the video streaming application may do again the discovery process to understand in which context it is in, and then may request to verify the authentication of the context (e.g., multiple times according to a defined policy and desirable security levels). The same may happen to any additional device in the house connecting to the video service provided by content service 110. On each request of the end-user to watch video in the application, the application may issue a request to authenticator 132 and may validate that the video service account with content service 110 is associated with the household from which the request came from.

From stage 210, where authenticator 132 receives the request for content service, wherein the request comprises information associated with the context of the household from which the request came, method 200 may advance to stage 220 where authenticator 132 may authenticate the request based on the information associated with the context of the household from which the request came. For example, on each request of the end-user to watch video in the application, the application may issue a request to authenticator 132 and may validate that the video service account with content service 110 is associated with the household from which the request came.

When connecting from outside the household, if the end user is out of the household and requesting to watch video, the video application may request from authenticator 132 to authenticate and confirm the association between the household's context and the video service account with content service 110. In this case, the result from authenticator 132 may be that the context does not match the video service account with content service 110. In this case the video application may decide to allow access for a limited time. After a while the context may not be associated with an active account and the video application may block the access to the content service. At this point, the one-time code process may be used in order to continue service.

Once authenticator 132 authenticates the request based on the information associated with the context of the household from which the request came in stage 220, method 200 may continue to stage 230 where authenticator 132 may allow the content service (as well as a tier of content service) to be provided in response to authenticating the request. For example, content service provider 110 (or service provider 108 when acting as content service provider 110) may get a response from authenticator 132 regarding the verification status of the request and provide access to their services accordingly. Consequently, the end user may use the internet as usual and be able to use services provided by content service provider 110 without the need to create a username and remember passwords for example. Once authenticator 132 allows the content service to be provided in response to authenticating the request in stage 230, method 200 may then end at stage 240.

Consistent with embodiments of the disclosure, a service contract terms and conditions may define an account for service access by a plurality of households that may include household 102. Accordingly, a signature (as described above) may be obtained and stored for each of the plurality of households and associated with the account. The plurality of households, may comprise but not limited to, a new house, a second house, a summer house, a vacation house, or a university residence. When an end user proves (as described above) that the end user is in any of the plurality of households, the end user may gain access to the services or service level agreed upon in the service contract terms and conditions. In this way, when the end user appears in more than one location (i.e., household), embodiments of the disclosure may authenticate to multiple contexts corresponding the plurality of households. This may allow for temporal movement. In other words, embodiments of the disclosure may allow, for example, for planning for vacations in advance or maybe establishing a temporary alternative context for that household for small periods of time. A child's university residence or a summer home may be a possible multiple context per household as long as embodiments of the disclosure authenticate that this is not a sharing of an account by determining the these are multiple households associated with one account that is allowed by the service contract terms and conditions.

Figure 3:
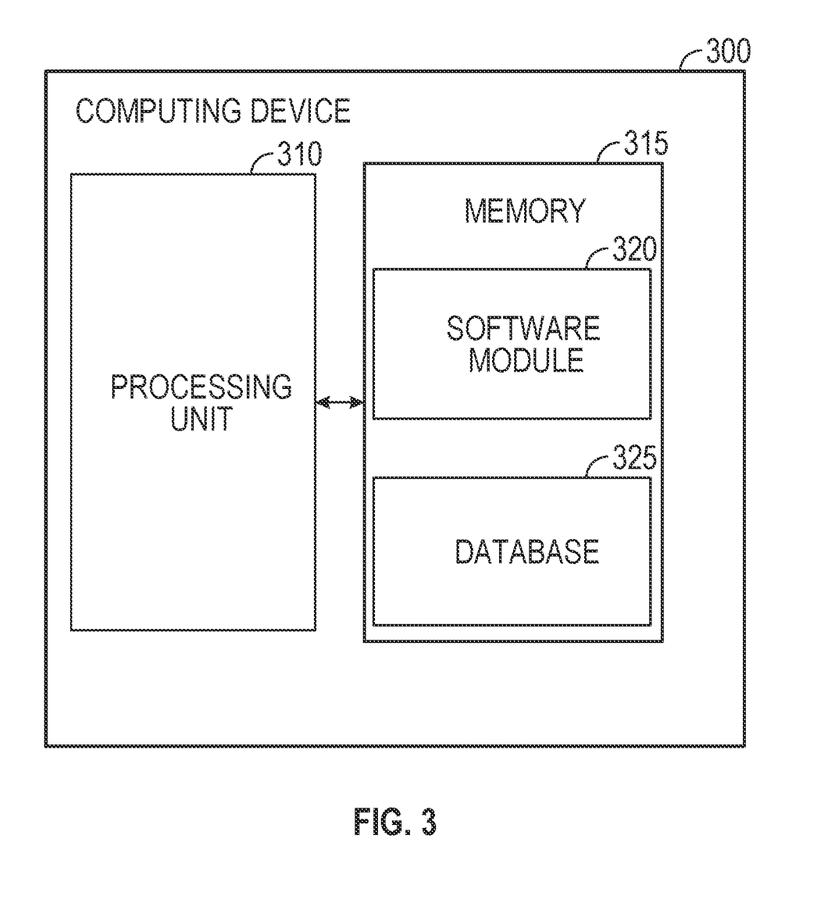
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing context-aware authentication as described above with respect to FIG. 3. Computing device 300, for example, may provide an operating environment for first IoT device 112, second IoT device 114, first smart TV 116, first smart phone 118, set-top box 120, home gateway 122, third IoT device 124, second smart TV 126, second smart phone 128, router 130, and authenticator 132. First IoT device 112, second IoT device 114, first smart TV 116, first smart phone 118, set-top box 120, home gateway 122, third IoT device 124, second smart TV 126, second smart phone 128, router 130, and authenticator 132 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a request for content service from a user device in a household, wherein the request comprises a signature for the user device for the household from which the request came, wherein the signature is derived from information associated with a context of the household from which the request came, the information associated with the context of the household comprising discovery protocol information for at least one device of devices within the household, internal network traffic between the devices of the household within the household, and network traffic to and from the household to a service provider, and wherein a different signature is associated with the same user device for a different household;
   authenticating the request based on the information associated with the context of the household from which the request came; and
   allowing the content service to be provided in response to authenticating the request.

2. The method of claim 1, wherein authenticating the request comprises:
   creating the signature from the information associated with the context of the household; and
   determining that the signature is associated with an account that is authorized to receive the content service.

3. The method of claim 2, wherein determining that the signature is associated with the account that is authorized to receive the content service comprises determining that the signature is present in an element of a list wherein the signature was previously received, associated with the account, and added to the list.

4. The method of claim 1, wherein authenticating the request comprises determining that the signature is associated with an account that is authorized to receive the content service.

5. The method of claim 4, wherein determining that the signature is associated with the account that is authorized to receive the content service comprises determining that the signature is present in an element of a list wherein the signature was previously received, associated with the account, and added to the list.

6. The method of claim 1, wherein the signature further comprises information on previous signatures.

7. The method of claim 1, wherein the signature comprises a dynamic unique identifier changing with time based on changes to the traffic within the household the network traffic to and from the household.

8. The method of claim 7, wherein the traffic within the household the network traffic to and from the household are captured over time.

9. A system comprising:
   a memory storage; and
   a processing unit, the processing unit coupled to the memory storage, wherein the processing unit is operative to:
      receive a request for content service from a user device in a household, wherein the request comprises a signature for the user device for the household from which the request came, wherein the signature is derived from information associated with a context of a household from which the request came, the information associated with the context comprising discovery protocol information for at least one device of devices within the household, internal network traffic between the devices of the household within the household, and network traffic to and from the household to a service provider, and wherein a different signature is associated with the same user device for a different household;
      authenticate the request based on the information associated with the context of the household from which the request came; and
      allow the content service to be provided in response to authenticating the request.

10. The system of claim 9, wherein the processing unit being operative to authenticate the request comprises the processing unit being operative to:

create the signature from the information associated with the context of the household; and determine that the signature is associated with an account that is authorized to receive the content service, wherein the processing unit being operative to determine that the signature is associated with the account that is authorized to receive the content service comprises the processing unit being operative to determine that the signature is present in an element of a list wherein the signature was previously received, associated with the account, and added to the list.

11. The system of claim 9, wherein the processing unit being operative to authenticate the request comprises the processing unit being operative to determine that the signature is associated with an account that is authorized to receive the content service wherein the information associated with the context of the household comprises the signature, wherein the processing unit being operative to determine that the signature is associated with the account that is authorized to receive the content service comprises the processing unit being operative to determine that the signature is present in an element of a list wherein the signature was previously received, associated with the account, and added to the list.

12. A non-transitory computer-readable medium that stores a set of instructions which when executed perform a method executed by the set of instructions comprising:

receiving a request for content service, wherein the request comprises information associated with a context of a household from which the request came, wherein the information associated with the context of the household comprises a signature derived from discovery protocol information associated with at least one device of devices within the household, information associated with internal network traffic between the one or more devices of the household within the household, and network traffic to and from the household to a service provider, and wherein a different signature is associated with the same user device for a different household;

authenticating the request based on the information associated with the context of the household from which the request came; and allowing the content service to be provided in response to authenticating the request.

13. The non-transitory computer-readable medium of claim 12, wherein authenticating the request comprises:

creating the signature from the information associated with the context of the household; and determining that the signature is associated with an account that is authorized to receive the content service, wherein determining that the signature is associated with the account that is authorized to receive the content service comprises determining that the signature is present in an element of a list wherein the signature was previously received, associated with the account, and added to the list.

14. The non-transitory computer-readable medium of claim 12, wherein authenticating the request comprises determining that the signature is associated with an account that is authorized to receive the content service.

15. The non-transitory computer-readable medium of claim 14, wherein determining that the signature is associated with the account that is authorized to receive the content service comprises determining that the signature is present in an element of a list wherein the signature was previously received, associated with the account, and added to the list.

16. The non-transitory computer-readable medium of claim 15, further comprising allowing the content service to be provided for a limited time when the signature is not present in the element of the list.

17. The non-transitory computer-readable medium of claim 16, further comprising:

blocking the content service after the limited time when the signature is not present in the element of the list; and initiating a one-time code process to authenticate the request.

18. The non-transitory computer-readable medium of claim 12, wherein the signature further comprises information on previous signatures.

19. The non-transitory computer-readable medium of claim 12, wherein the signature comprises a dynamic unique identifier changing with time based on changes to the traffic within the household the network traffic to and from the household.

20. The non-transitory computer-readable medium of claim 19, wherein the traffic within the household the network traffic to and from the household are captured over time.

* * * * *